(12) United States Patent
Christoffersson et al.

(10) Patent No.: US 7,886,013 B2
(45) Date of Patent: Feb. 8, 2011

(54) SELECTIVE THROTTLING PRESENCE UPDATES

(75) Inventors: Jan Christoffersson, Luleå (SE); David Henrikssson, Umeå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 927 days.

(21) Appl. No.: 11/599,591

(22) Filed: Nov. 15, 2006

(65) Prior Publication Data

US 2007/0150605 A1    Jun. 28, 2007

Related U.S. Application Data

(60) Provisional application No. 60/750,364, filed on Dec. 15, 2005.

(51) Int. Cl.
   *G06F 15/16* (2006.01)
(52) U.S. Cl. ..................................................... 709/206
(58) Field of Classification Search ................ 709/229, 709/227, 224, 223, 220, 208, 206, 204, 217, 709/245; 379/88.03, 80, 265.09, 265.06, 379/209.01, 202.01, 201.1, 201.02, 114.01; 370/401, 352, 351, 328, 310.02, 229, 234, 370/286, 366, 468, 474
   See application file for complete search history.

(56) References Cited

U.S. PATENT DOCUMENTS

2003/0104819 A1 *  6/2003  Knauerhase et al. ........ 455/456
2004/0122977 A1    6/2004  Moran et al.
2006/0064473 A1 *  3/2006  Borella et al. ............... 709/220

FOREIGN PATENT DOCUMENTS

WO    WO 01/19124           3/2001
WO    WO 02/35253           5/2002
WO    WO 0235253 A1 *       5/2002

OTHER PUBLICATIONS

Written Opinion of International Searching Authority for International Application No. PCT/SE2006/050517 dated May 10, 2007.

(Continued)

*Primary Examiner*—Wing F Chan
*Assistant Examiner*—Charles Murphy
(74) *Attorney, Agent, or Firm*—Nixon & Vanderhye P.C.

(57) ABSTRACT

Presence communications are selectively controlled to reduce signaling traffic associated with one or more presence attributes without impacting when or how frequently presence messages associated with other presence attributes may be sent. A first threshold condition is determined that is associated with sending a presence publication message including first presence information from a presence entity to a presence server. A second threshold condition is determined that is associated with sending a presence publication message including second different presence information from the presence entity to the presence server. How frequently a presence publication message including the first presence information is sent to the presence server by the presence entity is selectively controlled based on the first threshold condition so that at least some presence publication messages including the second presence information are sent to the presence server by the presence entity more or less frequently than presence publication messages including the first presence information.

28 Claims, 6 Drawing Sheets

OTHER PUBLICATIONS

Day et al., *A Model for Presence and Instant Messaging*, Network Working Group, Request for Comments: 2778, Feb. 2000; pp. 1-12.

Lonnfors et al., *Session Initiation Protocol (SIP) extension for Partial Notification of Presence Information*, draft-ietf-simple-partial-notify-05.txt, SIMPLE WG, Internet-Draft, May 24, 2005, pp. 1-15.

Lonnfors et al., *Partial Publication of Presence Information*, draft-ietf-simple-partial-publish-02.txt, SIMPLE WG, Internet Draft, Feb. 21, 2005, pp. 1-9.

Presence SIMPLE Specification, Candidate Version 1.0—Mar. 17, 2005, Open Mobile Alliance, OMA-TS-Presence_SIMPLE-V1_0-20050317-C, pp. 1-98.

* cited by examiner

SELECTIVE THROTTLING PRESENCE UPDATES

RELATED APPLICATION

This application claims the priority and benefit of U.S. Provisional patent application 60/750,364, filed Dec. 15, 2005, which is incorporated herein by reference in its entirety.

TECHNICAL FIELD

The technical field relates to communicating presence information between computers. In one non-limiting example application, the technology described here may be used in communicating presence information in mobile communications systems.

BACKGROUND

A presence service is a service to exchange presence information Items indicating states, i.e., presence of human beings, articles or items, and services. The IETF RFC2778 describes a basic architecture of a presence service. Clients using the presence service are classified into two types of clients: presentities (on an information delivery side) such as users providing presence information and watchers (on an information receiver side) observing the presence information. The word presentities is a combination of words "presence" and "entity" and was first introduced in RFC 2778. Originally, it was defined as a logical entity which provides presence information and usually refers to a human. Although a presentity is most commonly a reference for a person, it may represent a role such as "help desk" or a resource such as "conference room #27." Presentities are generally referenced by distinguished names, such as "sip: joe.bloggs@example.com" or by phone numbers like "tel:+12345678". In this case presence information describes the availability, proximity, activity level, status, operating state, capabilities, and/or willingness of a presentity to communicate via set of communication services. For example, users of the instant messenger ICQ ("I seek you") are presentities, and their presence information is ICQ user status (online, offline, away, etc.). Although there may be multiple presence sources associated with a single presentity, for ease of description here, only the term presentity is used and includes the logical entity and/or one or more presence sources associated with that logical entity.

The presence service receives the presence information from presentities and then delivers that presence information to watchers. A watcher can keep track of presentities. The most common use of presence today is a status indicator displayed on most instant messaging clients, typically in form of an easy to convey graphic symbol and a list of text descriptions of each of the status. Commonly used status that offer extended information on the user's availability are "free for chat", "away", "do not disturb", and "out to lunch", and exist in many variations across different modern instant messaging clients. User selectable richer information such as user mood, location, and free text status may also be available. Presence is different from traditional on-hook telephone status in that it deals with the availability of the user not just with the availability of the user device and its required technical properties.

The presentities publish their presence information to a presence server, which composes a notification to the watcher. The presence server handles publications by refreshing presence information, replacing existing presence information with newly published presence information, or removing presence information for a given presentity. The notification typically contains the information from all the presentities that the watcher has subscribed to. When any of the presentities change their presence state, they again publish their new presence information to the presence server, which in turn notifies the watcher with the new presence information.

A protocol that is used for presence is the Session Initiation Protocol (SIP). In RFC3261 describing the SIP protocol, the publications sent from the presentity to the watcher are in the form of SIP PUBLISH messages, and the notifications sent from the presence server to the watcher is in the form of SIP NOTIFY messages. A high level overview of a presence system 10 and signaling is seen in FIG. 1. Multiple users 12 labeled 1-5 send SIP PUBLISH messages to the presence server 14. The presence server 14 processes those messages and sends SIP NOTIFY messages to the watcher 16 based on the watcher's subscription information provided to the presence server 14 via a SIP SUBSCRIBE message.

Although presence applications have been used over the fixed internet for a number of years, presence applications are applicable to cellular and other wireless networks as well. A significant problem with applying presence over cellular networks is the potentially huge amount of signaling associated with presence messages that could easily drain the cellular system of capacity. Studies by the assignee of this application regarding the impact of presence traffic on cellular capacity in GSM/EDGE suggest that even a presence application which is moderate in signaling may reduce cellular system capacity by 10-15 percent for Voice over IP (VoIP) over GSM/EDGE. With increased signaling, the capacity reduction can easily reach unacceptable levels.

There have been efforts to limit the presence traffic are under development, but they have not been sufficient to consistently keep the traffic at a reasonable level and to provide the desired flexibility and selectivity. For example, when presence applications become available in mobile terminals, new types of presence information will likely become interesting and will be need to be supported. Geographical location is particularly meaningful presence information for mobile terminals because the presentities associated with those mobile communications terminals can move during a session, in contrast for example, to presentities connected via the fixed position Internet.

One possibility for obtaining geographical information is to use a GPS device in the presentities's communications terminal or user equipment, e.g., cell phone, PDA, lap top computer, etc. When the GPS coordinates indicate that the communications terminal has moved, the new coordinates are published to the presence server which distributes that information to the watchers. Unless the communications terminal itself limits these new coordinates publications, this approach will result in a tremendous amount of signaling. For example, if the terminal is located in a moving car, then the coordinate update publications will be generated more or less continuously. Supporting this kind of signaling in wireless networks that have limited bandwidth capacity is a significant problem.

To illustrate these difficulties in a SIP messaging context, the presence update signaling can be divided into two phases. The first phase is the SIP PUBLISH messages sent from the presentity to the presence server, and the second phase is the SIP NOTIFY sent from the presence server to the watcher. The signaling in the first phase does not allow an efficient way for the presence server to limit the presence update signaling traffic. One possibility is for the presence server to respond to a PUBLISH message with a service unavailable message with a "Retry-after" header field indicating the time that the presentity must wait until the presentity can send a new PUBLISH message. But this does not guarantee that the presentity will not continue to send PUBLISH messages at a high frequency, i.e., very frequently. Another possibility is for the presence server to hold back the SIP 200 OK message which must be sent in the SIP protocol as an acknowledgement to the PUBLISH message before the presentity can send a new PUBLISH. But this strategy will trigger a retransmission of the PUBLISH message if the 200 OK reply is held back long enough generating even more traffic. So in this first phase, the inefficiencies relating to the amount of presence signaling can be attributed to the behavior of the individual terminals/presentities running presence applications.

A more attractive solution is to have the presence server (or other network node) send parameters to mandate a certain behavior. For example, the Presence SIMPLE Specification published by the Open Mobile Alliance (OMA) describes an optional parameter called SOURCE-THROTTLE-PUBLISH, which specifies a minimum time between successive PUBLISH messages. But the problem with this parameter is that if it is set to a high value, the accuracy of certain presence attributes will decrease significantly even though the impact on the accuracy of other presence attributes is not significant. In other words, the SOURCE-THROTTLE-PUBLISH parameter does not take into account that different presence attributes might be better served by different presence attribute values. Since there is only one SOURCE-THROTTLE-PUBLISH parameter for all presence attributes, one presence attribute which needs to be "throttled" causes throttling of other presence attributes which do not need throttling. In fact, for some presence attributes, such throttling may reduce the accuracy of the presence attribute information so that it no longer is valuable for the watcher.

SUMMARY

The inventors solved these problems using a new strategy for presence updating. Presence communications are selectively controlled to reduce signaling traffic associated with one or more presence attributes without impacting when or how frequently presence messages associated with other presence attributes may be sent. A first threshold condition is determined that is associated with sending a presence publication message including first presence information from a presence entity to a presence server. A second threshold condition is determined that is associated with sending a presence publication message including second different presence information from the presence entity to the presence server. How frequently a presence publication message including the first presence information is sent to the presence server by the presence entity is selectively controlled based on the first threshold condition so that at least some presence publication messages including the second presence information are sent to the presence server by the presence entity more or less frequently than presence publication messages including the first presence information. How frequently a presence publication message including the first presence information is sent is preferably independent of how frequently a presence publication message including the second presence information is sent.

How frequently a notify message including information associated with the first presence information is transmitted by the presence server to a watcher may also be selectively controlled based on the determined condition. A notify message including information related to the second publication information may be transmitted to a watcher more or less frequently than transmitting a publication message including the first presence information. One example of the first presence information is position or location information pertaining to a position or location of the presence entity.

Examples of the first threshold condition include a minimum time period that must expire before the presence entity may send the publication message including the first presence information to the presence server. Another example is a minimum change of a parameter (e.g., distance moved by the presence entity) that must occur before the presence entity may send the publication message including the first presence information.

In a preferred non-limiting example implementation, how frequently a publication message including the first presence information is sent to the presence server is adaptable. For example, that adaptability may be based on a load condition, e.g., a signaling load on the presence server associated with presence publication message traffic. When the load decreases below a load threshold value, publication messages including the first presence information may be sent more frequently. When the load increases above the load threshold value, publication messages including the first presence information may be sent less frequently.

The selective presence updating technology may be implemented in the presence server, which can be located in an IP multimedia system node associated with an access network accessible to user equipment over a radio interface or in a wire/fiber-bound network node. The selective presence updating technology may also be implemented in the presence entity such as a user equipment. For example, the user equipment may be a wireless mobile terminal that communicates with an access network over an air interface or a communications device that communicates with an access network over a wire or fiber interface.

A significant benefit of this selective presence updating technology is that the amount of signaling, and hence the load caused by presence signaling, can be reduced while still minimally impacting the accuracy of the presence information. Having the selective control be adaptive allows flexibility to accommodate current load conditions and to permit other presence attributes to be updated at a different frequency. For example, presence attributes that do not cause heavy signaling, e.g., a "busy" attribute, can be updated immediately. If desired, the selective presence updating technology may be implemented under the control of the presence server to ensure compliance by individual presence entities and thereby ensure that the presence update traffic is at reasonable levels.

DETAILED DESCRIPTION

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. For example, the description below uses SIP messages as examples of presence messages, but the technology is not limited to SIP messages—any suitable presence messaging protocol may be used. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 2:
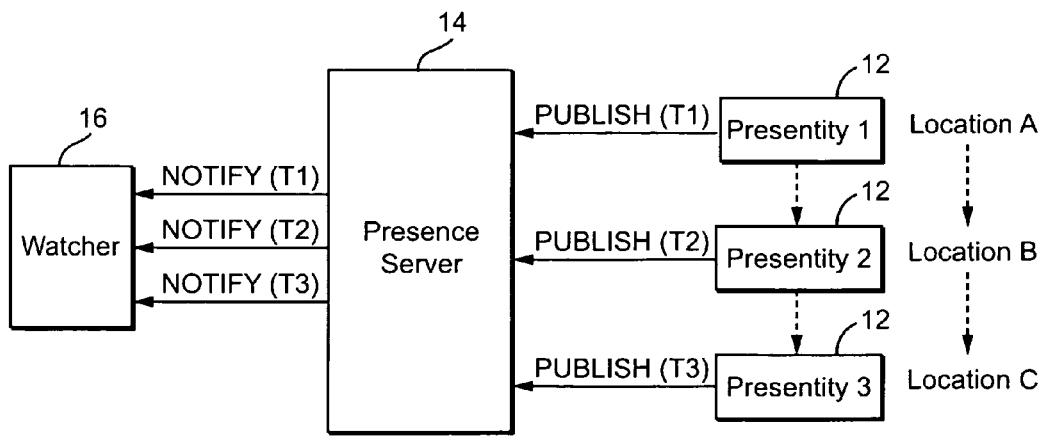
FIG. 2 is a function block diagram of a presence communication system in which the presentity is moving rapidly to different geographical locations or coordinates.

FIG. 2 is a function block diagram of a presence communication system in which a presentity is moving rapidly to different geographical locations or coordinates. Presentity 12 is moving rapidly, for example in a vehicle, and at each new location A, B, and C, it sends a PUBLISH message to update its new location at time T1 for location A, at time T2 for location B, and at time T3 for location C. For a moving presentity, those three messages may be sent very frequently, e.g., one immediately after the other, resulting in a substantial signaling load in terms of PUBLISH messages as well as resulting NOTIFY messages corresponding to times T1, T2, and T3. It is clear from this one example that certain presence attributes may flood the presence server with presence updates on a nearly continual basis. But other presence attributes are not so prolific.

Figure 1:
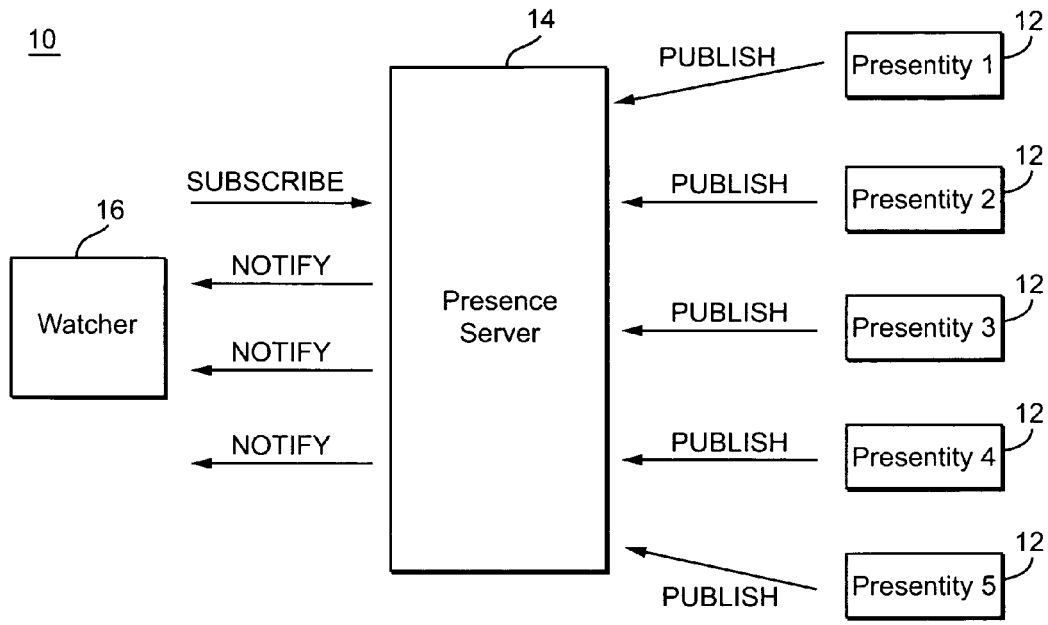
FIG. 1 is a function block diagram of a presence communication system.
Figure 3:
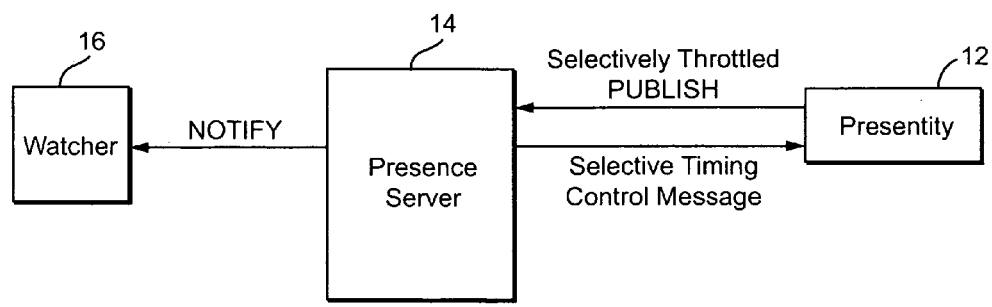
FIG. 3 is a function block diagram of a presence communication system showing an example of selective publication control.

Selective presence update messaging overcomes these obstacles. FIG. 3 is a function block diagram showing an example presence communication system with presence server 14, watcher 16, and presentities 12 as in FIG. 1. But here the presence server sends a selective timing control message to each presentity 12 associated with at least one presence attribute. In the example of FIG. 2, that presence attribute is geographical location or position of the presentity corresponding to the geographical location or position of the presentities's communications terminal or user equipment. The selective timing control message informs the presentity 12 that publication messages carrying geographical presence update information may only be sent after a predetermined threshold time period has expired. That threshold time period is preferably selected so that presence update signaling does not occur so frequently that the traffic load is excessive but occurs frequently enough so that the presence updates are communicated to watchers in a useful time frame.

Significantly, the publication messages associated with other presence attributes of the presentity 12 are not necessarily "throttled" or otherwise constrained by the predetermined threshold time period established for geographical presence update information. For example, the presentity 12 may transmit a publication message with a "busy" presence attribute update (e.g., "I'm busy") and then immediately transmit another publication message with a "busy" presence attribute update (e.g., "I'm not busy") without observing any minimum intervening time period. This selective control of presentity publication messages for individual presence attributes permits excellent control of signaling load while still providing relevant presence information in a relevant and useful time period. In this example, the fact that the presentity's vehicle has moved one block is, in many instances, not time critical information to the watcher 16. So throttling publications with geographical presence update information is helpful for signaling/load control. But whether the presentity 12 is busy or available for communication is more likely to be time critical to the watcher 16. Throttling in this case is less desirable. In this way, publication frequency case be tailored to individual presence attributes.

In response to the selective timing control message, the presentity 12 selectively controls when it transmits a PUBLISH message pertaining to geographical presence update information. In FIG. 3, that selective timing is referred to as "throttled" to convey that the rate or frequency at which publication messages with geographical presence update information is constrained or limited. But the selective timing could be any timing that is particularly appropriate for the specific individual presence attribute being published. The presence server 14 notifies the watcher 16 of the published attribute information when it is received, as usual.

Figure 4:
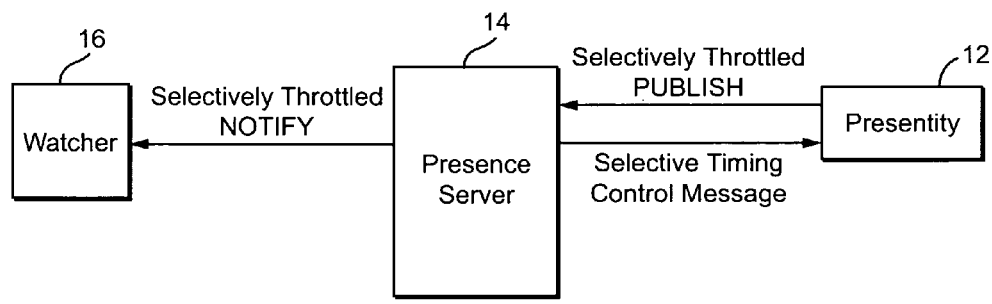
FIG. 4 is a function block diagram of a presence communication system showing an example of selective publication control coupled with selective publication control.

FIG. 4 shows an alternative embodiment that is similar in the selective control of publications of individual presence attribute information but also includes the feature of selectively controlling the timing of notification messages to the watcher 16 relating to received publication information. The presence server 14 also determines a rate at which notify messages for a particular presence attribute will be sent to the watcher 16. For one presence attribute, the presence server 14 may wait a first minimum threshold time period between sending successive notify messages relating to that one presence attribute. For another presence attribute, the presence server 14 may wait a second minimum threshold time period between sending successive notify messages relating to that other presence attribute, where the first and second time periods are different. One of the time periods might even be no minimum threshold time period. This selective notification control for individual presence attributes provides similar benefits to those achieved with selective publication control for individual presence attributes. The selective notification control may be performed solely in the presence server 14 without having to send a control message to the presentity 12 or the watcher 16. In another embodiment, the selective notification control may be performed without necessarily using the selective publication control.

Figure 5:
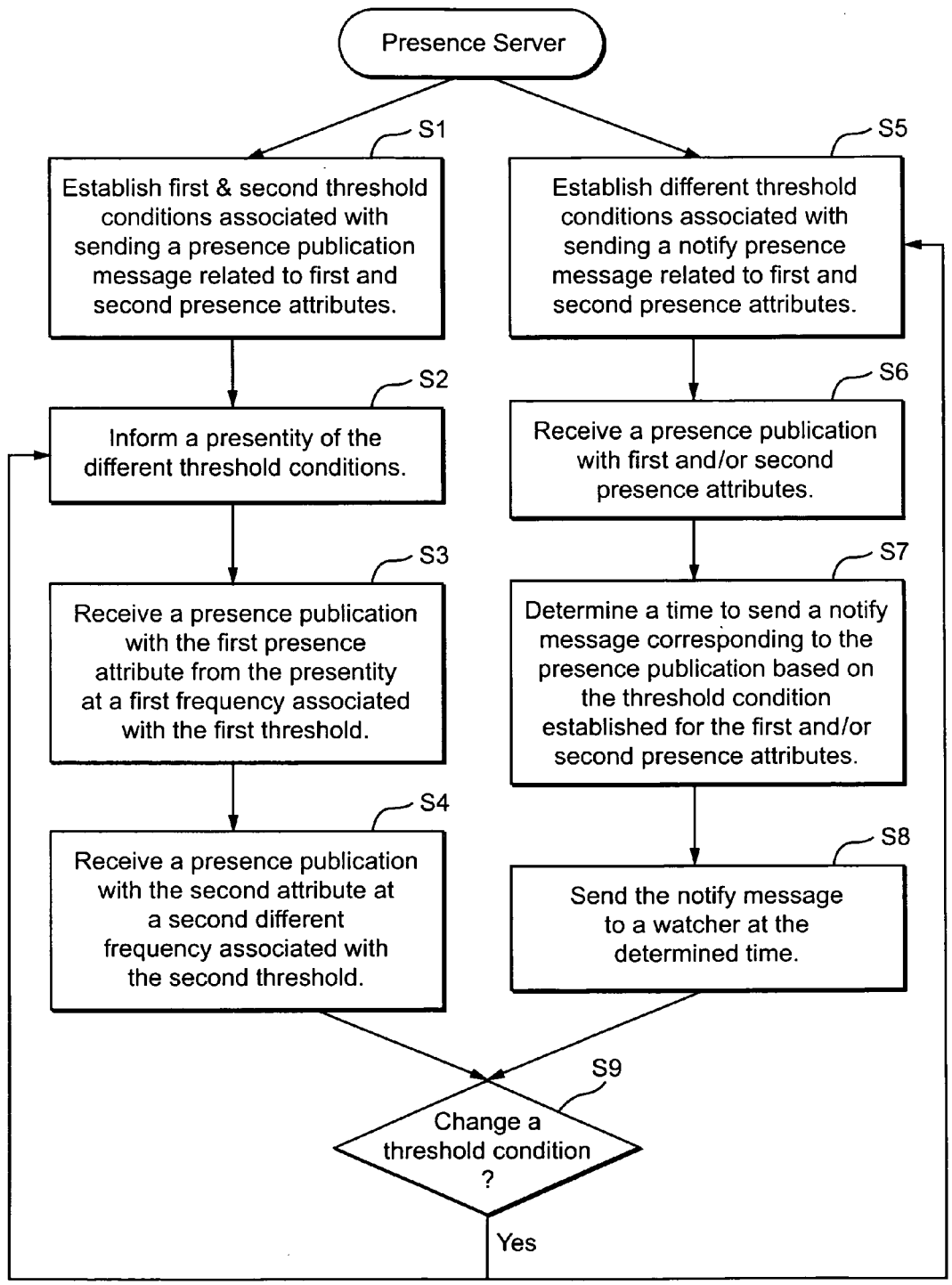
FIG. 5 is a flowchart diagram illustrating non-limiting, example procedures that may be followed by a presence server in implementing one or both of selective publication control and selective notification control.

FIG. 5 is a flowchart diagram illustrating non-limiting, example procedures that may be followed by a presence server in implementing one or both of selective publication control and selective notification control. The presence server may perform the two columns of procedures alone or together. In step S1, the presence server establishes first and second threshold conditions associated with sending a presence publication message related to first and second attributes.

Only two thresholds and two presence attributes are described for purposes of illustration. But it will be appreciated that thresholds may be established for any number of presence attributes. Although the example above used a minimum timing period as the threshold, other thresholds may be used. For example, in the geographical location update example, the threshold could be the minimum distance that the presentity must move before a publication message with a geographical location update may be sent to the presence server.

The presence server informs a presentity of the different threshold conditions (step S2). A presence publication message is received from the presentity containing the first presence attribute from the presentity at a first frequency associated with the first threshold (step S3). A presence publication is received with the second attribute at a second different frequency associated with the second threshold (step S4). If there is a change in the threshold condition, (step S9), then control returns to step S1 to establish one or more new thresholds in response to the change or to S2 to inform the presentity of the new threshold(s).

In the right column, the presence server establishes different threshold conditions associated with sending a presence notify message related to first and second attributes (step S5). A presence publication message is received from the presentity containing first and/or second presence attributes (step S6). The presence server determines a time to send a notify message corresponding to the presence publication based on the threshold condition established for the first and/or second presence attributes (step S7). The presence server then sends the notify message relating to the particular attribute to a watcher at the time determined for that attribute. If there is a change in the threshold condition, (step S9), then control returns to step S5 to establish one or more new thresholds in response to the change.

The thresholds are preferably adaptive to one or more changing conditions. For example, it may be beneficial to adapt one or more attribute thresholds, thus how frequently a publication message including the presence information related a particular presence attribute is sent to the presence server, based on a detected signaling load on the presence server, a detected traffic load, or factors other than load. Moreover, the load may be defined with different degrees of granularity such as total traffic load (including voice, presence, and other data), just presence load, or some other subset of traffic load contributing factors. It could also be load in the whole network or load in part of the cellular network, i.e., in specific cell(s) or groups of cells. The load in the whole or part of the cellular network may be detected by a Radio Network Controller (RNC) or the like and signaled to the presence server, which then instigates throttling if the load exceeds a threshold. In this load changing scenario, when the load decreases below a load threshold value, publication messages including the first presence information can be sent more frequently. When the load increases above the load threshold value, publication messages including the first presence information can be sent less frequently.

Figure 6:
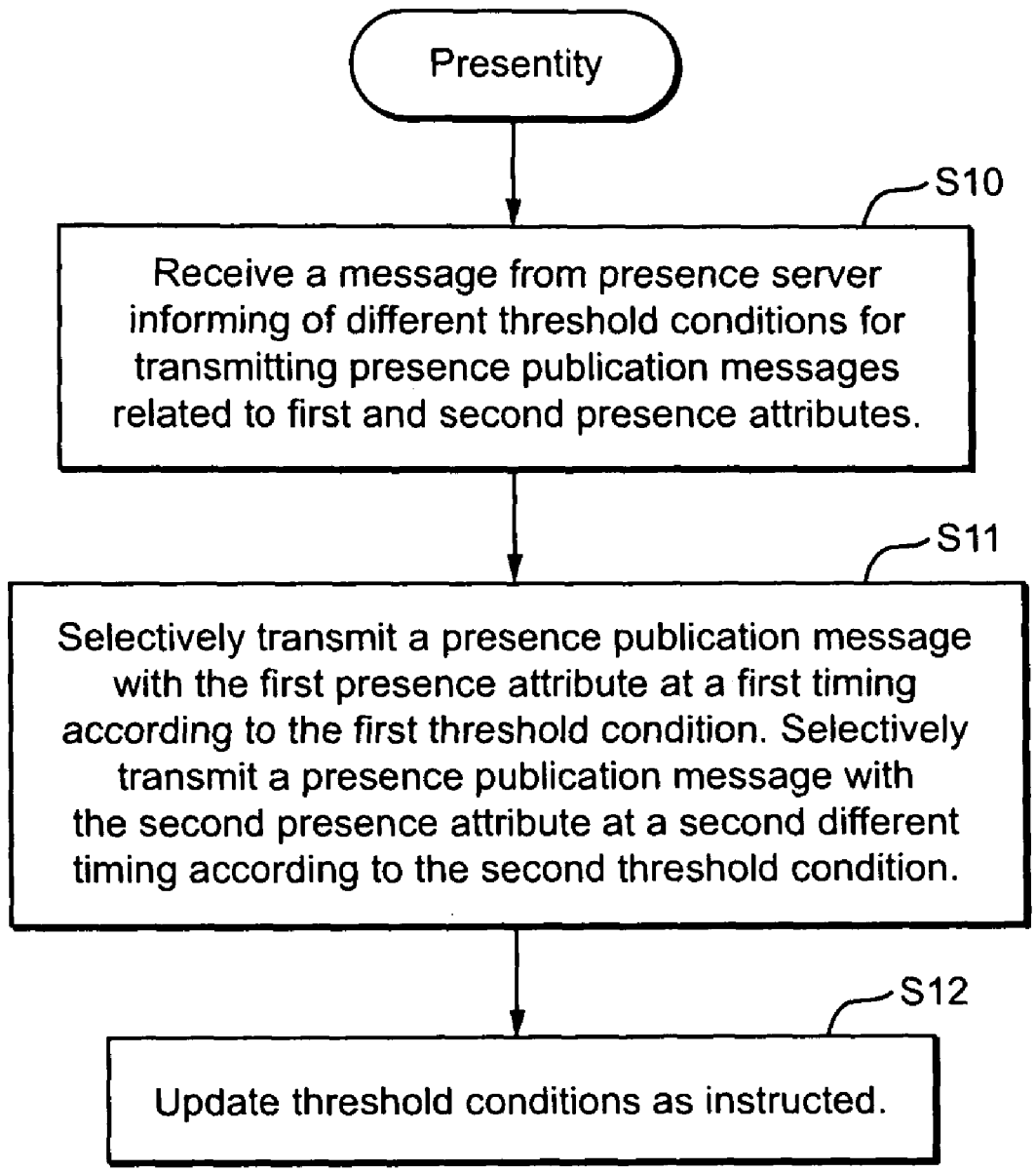
FIG. 6 is a flowchart diagram illustrating non-limiting, example procedures that may be followed by a presentity in implementing selective publication control.

FIG. 6 is a flowchart diagram illustrating non-limiting, example procedures that may be followed by a presentity in implementing selective publication control. The presentity receives a selective control message form the presence server that includes different threshold conditions for transmitting presence publication messages related first and second presence attributes (step S1). Again, any number of attributes may be selectively controlled. The presentity selectively transmits a presence publication message with the first presence attribute at a first timing according to the first threshold condition. It also selectively transmits a presence publication message with the second first presence attribute at a second timing according to the second threshold condition (step S11). The presentity updates any threshold conditions as instructed (step S12).

Figure 7:
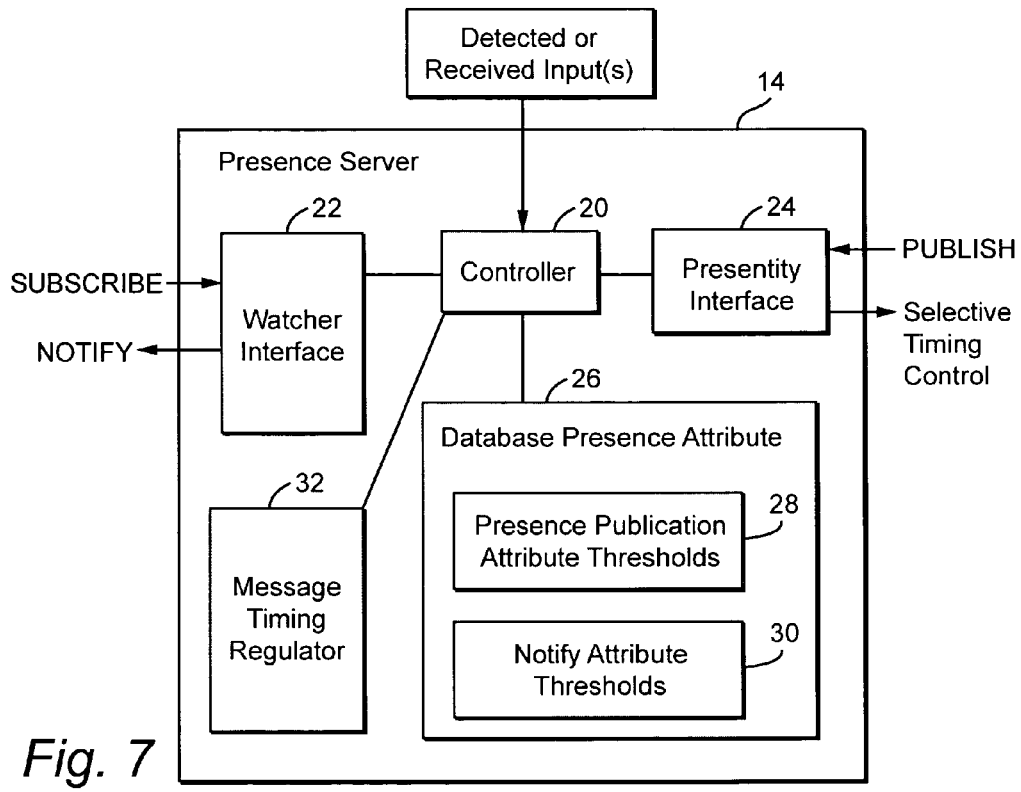
FIG. 7 is a function block diagram illustrating a non-limiting, example of a presence server.

FIG. 7 is a function block diagram illustrating a non-limiting, example of a presence server 14. The presence server 14 includes a controller 20 for controlling and coordinating the overall operations of the presence server 14. The controller 20 is coupled to a watcher interface 22 which receives SUBSCRIBE messages from watchers and transmits NOTIFY messages to watchers as instructed. The controller 20 is coupled to a presentity interface 24 which transmits selective timing control messages for certain presence attributes and receives PUBLISH messages from presentities. A presence attribute database 26 stores presence information relating to specific thresholds for individual presence publication attributes 28 and individual notify attributes 30. A message timing regulator 32 generates the selective timing control messages sent to presentities via the presentity interface 24 based on the threshold data in 28 and regulates when notify messages are sent to watchers via the watcher interface 22 based on the threshold data in 30. If adaptive, the controller 20 receives or detects input that reflects the need for adaptation of one or more of the thresholds, and in response thereto, updates the one or more thresholds in the database 26.

Figure 8:
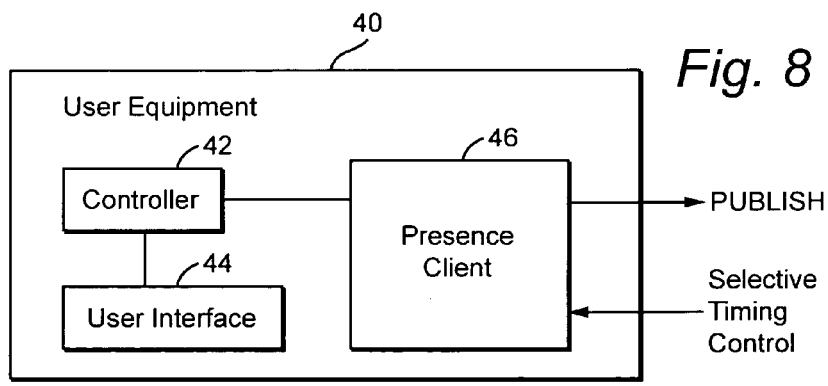
FIG. 8 is a function block diagram illustrating a non-limiting, example of a user equipment associated with a presentity.

FIG. 8 is a function block diagram illustrating a non-limiting, example of a user equipment 40 associated with a presentity. A user equipment is any device that the presentity or watcher uses to communicate with the presence server. Typically, it is some sort of computer-based device like a cell phone, PDA, lap top, etc. The user equipment 40 includes a controller 42 coupled to a controller 44 and to a presence client application 46. The presence client 46 receives the selective timing control messages from the presence server and generates PUBLISH messages for individual presence attributes which are transmitted in accordance with the selective timing control messages.

Figure 9:
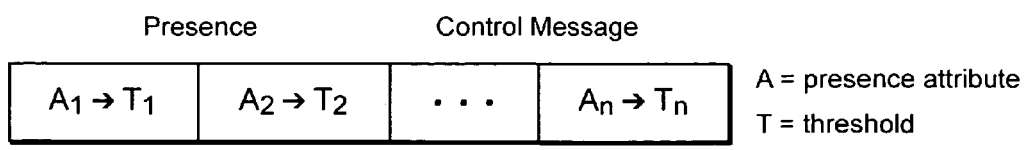
FIG. 9 illustrates a simplified example of a selective timing control message for presence information publication.

FIG. 9 illustrates a simplified example of a selective timing control message for presence information publication. The message includes multiple fields 1, 2, . . . , n. Each message field identifies a presence attribute A and a corresponding threshold condition for that attribute. The thresholds regulate how frequently a publication message may be transmitted for an individual presence attribute. The thresholds are typically different, but some may be the same, and other attributes may not have any associated threshold condition. In one non-limiting example, the selective timing control message can be formatted as a SIP message.

Figure 10:
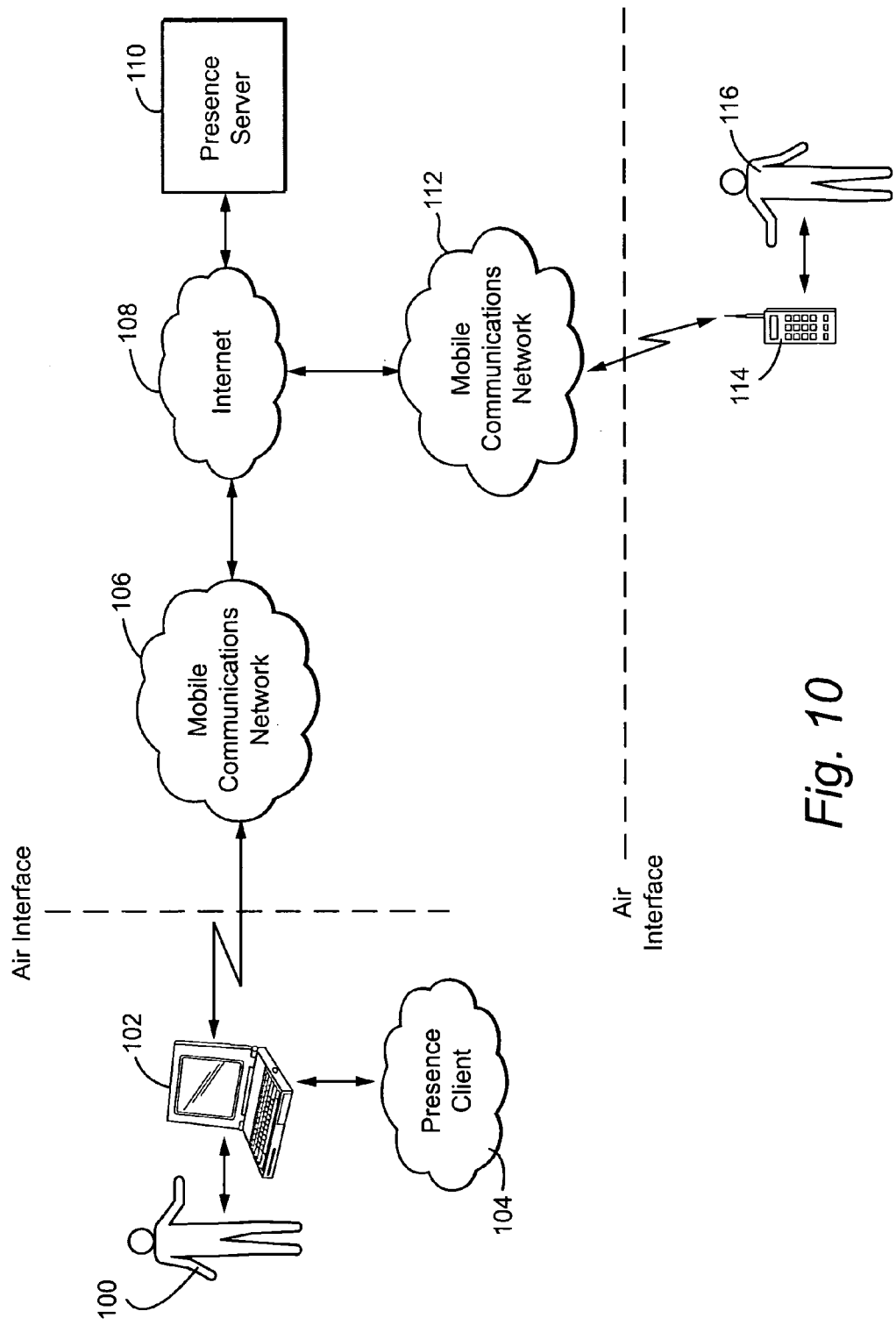
FIG. 10 shows an example, non-limiting application in a wireless communications system.

FIG. 10 shows an example, non-limiting application in a wireless communications system. A user acting as a watcher, and identified by reference numeral 100, accesses presence services hosted by an application server—specifically a presence server. The bi-directional arrow 112 represents the user 100 interface with a user terminal 102. The user 100 inputs information at the terminal 102 by way of a keyboard (for example), and receives information from the terminal 102 by way of the terminal's display (for example). A presence client 104 (a software application) runs on the terminal 102 to enable the user 100 to access presence services. In practice, the combination of the user 100, the presence client 104, and the terminal 102 may be considered to be the watcher. At other times, the user 100 may be acting as a presentity. The terminal 102 interacts wirelessly with the mobile communications network 106 over an air interface, generally represented by the dashed line. An external IP network such as the Internet 108 connects a presence application server 110 to the mobile communications network 106 and to another mobile communications network 112. Another user 116 communicating with user equipment in this case shown as a cell phone 114 is the presentity being watched. The presentity also communicates wirelessly over an air interface.

The mobile communications networks may, for example, be UMTS networks or other radio access networks supporting access to presence services. In UMTS, the radio access network employs one or more radio network controllers (RNCs) coupled to one or more radio base stations sometimes called Node B's or access points. It should also be noted that the technology described in this case is not limited to the provision of application services over a radio interface but also includes the provision of application services over a fixed line communications network. The mobile communications network may for example also include a serving GPRS support node (SGSN) coupled to the one or more RNCs and to a gateway GPRS support node (GGSN) which in turn may be coupled to an IP multimedia subsystem (IMS). The presence server may be located in the IMS along with other IMS type entities like serving and proxy call state control functions.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method for controlling presence communications, comprising:
   determining a first threshold condition associated with sending a presence publication message including first presence information from a presence entity to a presence server,
   determining a second threshold condition associated with sending a presence publication message including second presence information from the presence entity to the presence server, where the second presence information is different from the first presence information and the second threshold condition is different from the first threshold condition; and
   selectively controlling how frequently a presence publication message including the first presence information is sent to the presence server by the presence entity based on the first threshold condition such that at least some presence publication messages including the second presence information are sent to the presence server by the presence entity more or less frequently than presence publication messages including the first presence information;
   wherein how frequently a presence publication message including the first presence information is sent is independent of how frequently a presence publication message including the second presence information is sent.

2. The method in claim 1, further comprising:
   selectively controlling how frequently a notify message including information associated with the first presence information is transmitted by the presence server to a watcher based on the determined condition.

3. The method in claim 2, further comprising:
   transmitting to the watcher a notify message including information associated with the second publication information more or less frequently than transmitting a notify message including information associated with the first presence information.

4. The method in claim 1, wherein the first presence information includes position or location information pertaining to a position or location of the presence entity.

5. The method in claim 1, wherein the first threshold condition includes a minimum time period that must expire before the presence entity may send the publication message including the first presence information to the presence server.

6. The method in claim 1, wherein the first threshold condition is a minimum change of a parameter that must occur before the presence entity may send the publication message including the first presence information.

7. The method in claim 6, wherein the parameter is a distance moved by the presence entity.

8. The method in claim 1, further comprising:
   adapting how frequently a publication message including the first presence information is sent to the presence server based on a first factor.

9. The method in claim 8, wherein the first factor is a load condition such that when the load condition decreases below a load threshold value, publication messages including the first presence information are sent more frequently, and when the load condition increases above the load threshold value, publication messages including the first presence information are sent less frequently.

10. The method in claim 9, wherein the load includes a signaling load on the presence server associated with presence publication message traffic.

11. The method in claim 1 implemented in the presence server.

12. The method in claim 1 implemented in the presence entity.

13. Apparatus for use with presence communications, comprising electronic circuitry configured to:
   determine a first threshold condition associated with sending a presence publication message including first presence information from a presence entity to a presence server,
   determine a second threshold condition associated with sending a presence publication message including second presence information from the presence entity to the presence server, where the second presence information is different from the first presence information and the second threshold condition is different from the first threshold condition; and
   selectively control how frequently a presence publication message including the first presence information is sent to the presence server by the presence entity based on the first threshold condition such that at least some presence publication messages including the second presence information are sent to the presence server by the presence entity more or less frequently than presence publication messages including the first presence information;
   wherein how frequently a presence publication message including the first presence information is sent is independent of how frequently a presence publication message including the second presence information is sent.

14. The apparatus in claim 13, wherein the electronic circuitry is further configured to:
  selectively control how frequently a notification message including information associated with the first presence information is transmitted by the presence server to a watcher based on the determined condition.

15. The apparatus in claim 14, further comprising:
  a transmitter for transmitting to the watcher a notification message including information associated with the second publication information more or less frequently than transmitting a notification message including information associated with the first presence information.

16. The apparatus in claim 13, wherein the first presence information includes position or location information pertaining to a position or location of the presence entity.

17. The apparatus in claim 13, wherein the first threshold condition includes a minimum time period that must expire before the presence entity may send the publication message including the first presence information to the presence server.

18. The apparatus in claim 13, wherein the first threshold condition is a minimum change of a parameter that must occur before the presence entity may send the publication message including the first presence information.

19. The apparatus in claim 18, wherein the parameter is a distance moved by the presence entity.

20. The apparatus in claim 13, wherein the electronic circuitry is further configured to:
  adapt how frequently a publication message including the first presence information is sent to the presence server based on a first factor.

21. The apparatus in claim 20, wherein the first factor is a load condition such that when the load condition decreases below a load threshold value, the electronic circuitry is configured to receive publication messages including the first presence information more frequently, and when the load condition increases above the load threshold value, the electronic circuitry is further configured to receive publication messages including the first presence information less frequently.

22. The apparatus in claim 21, wherein the load includes a signaling load on the presence server associated with presence publication message traffic.

23. The apparatus in claim 13 implemented in the presence server.

24. The apparatus in claim 23, wherein the presence server is implemented in an IP multimedia system node associated with an access network accessible to user equipment over a radio interface.

25. The apparatus in claim 13 implemented in the presence entity.

26. The apparatus in claim 25, wherein the presence entity is implemented a user equipment.

27. The apparatus in claim 26, wherein the user equipment is a wireless mobile terminal that communicates with an access network over an air interface.

28. The apparatus in claim 26, wherein the user equipment is a communications device that communicates with an access network over a wire or fiber interface.

* * * * *